Feb. 20, 1951 H. O. PETERSON 2,542,700

PULSE MODULATION SYSTEM

Original Filed Feb. 20, 1942 5 Sheets-Sheet 1

INVENTOR
Harold O. Peterson
BY H. S. Grover
ATTORNEY

Feb. 20, 1951 H. O. PETERSON 2,542,700

PULSE MODULATION SYSTEM

Original Filed Feb. 20, 1942 5 Sheets-Sheet 2

INVENTOR
Harold O. Peterson
BY H. S. Grover
ATTORNEY

PULSE MODULATION SYSTEM

Original Filed Feb. 20, 1942 5 Sheets-Sheet 3

INVENTOR
Harold O. Peterson
BY H. S. Grover
ATTORNEY

Feb. 20, 1951 H. O. PETERSON 2,542,700

PULSE MODULATION SYSTEM

Original Filed Feb. 20, 1942 5 Sheets-Sheet 4

INVENTOR
Harold O. Peterson
BY H. S. Grover
ATTORNEY

INVENTOR
Harold O. Peterson
BY H. S. Grover
ATTORNEY

Patented Feb. 20, 1951 2,542,700

UNITED STATES PATENT OFFICE 2,542,700

PULSE MODULATION SYSTEM

Harold O. Peterson, Riverhead, N. Y., assignor to Radio Corporation of America, a corporation of Delaware Original application February 20, 1942, Serial No. 431,617, now Patent No. 2,392,546, dated January 8, 1946. Divided and this application April 18, 1945, Serial No. 588,940

11 Claims. (Cl. 250—17)

This invention relates to a pulse communication system in which the phase or frequency of the generated pulses is a function of an intelligence signal, and the present application is a division of my copending application Serial No. 431,617, filed in the U. S. Patent Office on February 20, 1942, now U. S. Patent 2,392,546 granted January 8, 1946.

It has been customary to modulate transmitters by modulating the amplitude, phase, or frequency of the radiated carrier. In the system of the present invention, the radiated carrier is broken up into pulses of short duration and the frequency or phase relationship of the pulses varied in accordance with the signal to be transmitted.

There are certain advantages to be had from pulse transmission at the ultra high frequencies. One of these advantages lies in the fact that it is possible to use certain types of ultra high frequency generators which require such a high voltage that it would not be possible to leave the voltage on continuously without destruction of the elements of the generator. It has also been found that by using the high voltage made possible in a pulsing system, the efficiency of the generator may be greatly increased. A further advantage in pulse transmission systems is that the frequency stability of the radiated carrier does not need to be maintained to the same close limits necessary in a continuous wave system.

A more detailed description of the invention follows, in which:

Figs. 1, 3 and 6 each illustrate graphically three conditions of the transmitted pulses which are respectively obtained by the three different pulse type transmitter embodiments of Figs. 2, 4 and 7 of the invention;

Figure 2:
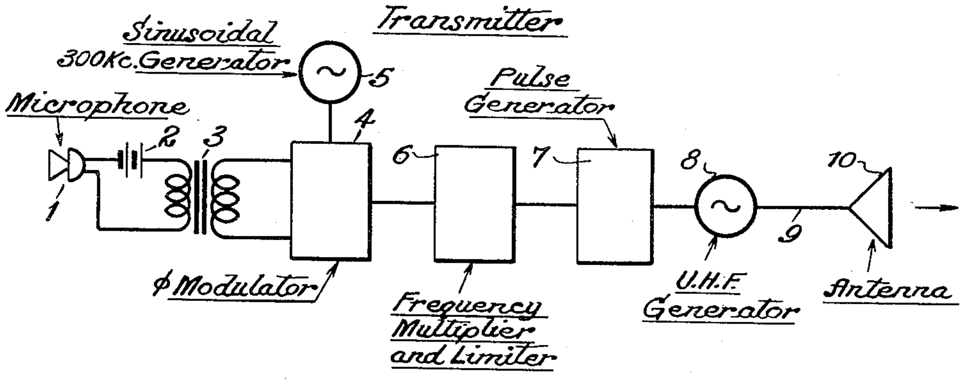
Figs. 2B, 5 and 8 illustrate three different receivers of the invention, for use respectively with the transmitters of Figs. 2, 4 and 7.
Fig. 2A illustrates in detail, by way of example only, circuit arrangements which the pulse generator 7 and the ultra high frequency generator 8 of the transmitter of Fig. 2 may take.
Figure 2A:
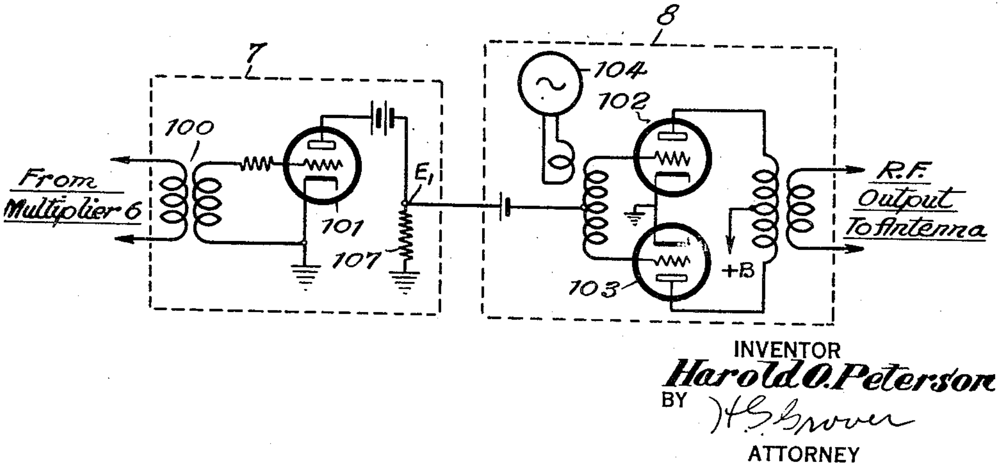

Figs. 2C, 2D, 2E, 2F and 2G graphically illustrate the operation of the system of Fig. 2*a*.

Figure 9:
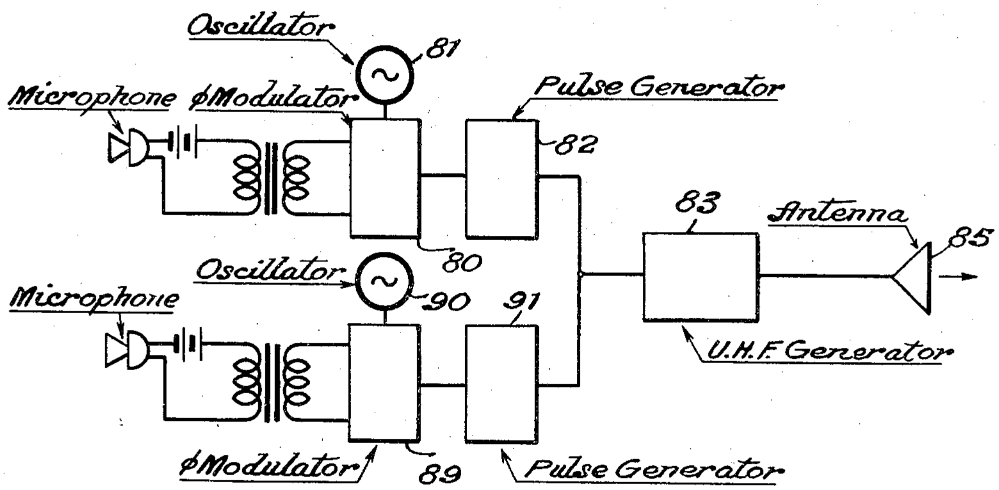
Figure 10:
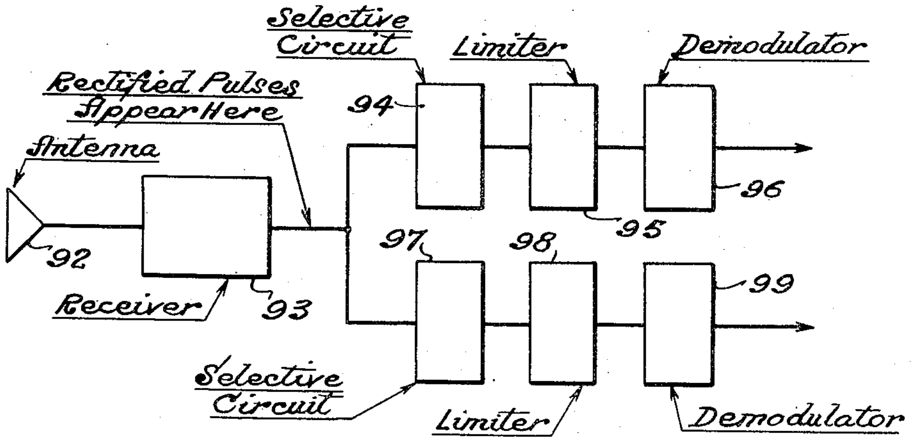

Figs. 9 and 10 respectively illustrate a transmitter and a receiver for use in a multiplex pulse modulation system, in accordance with the invention.

Figure 1:
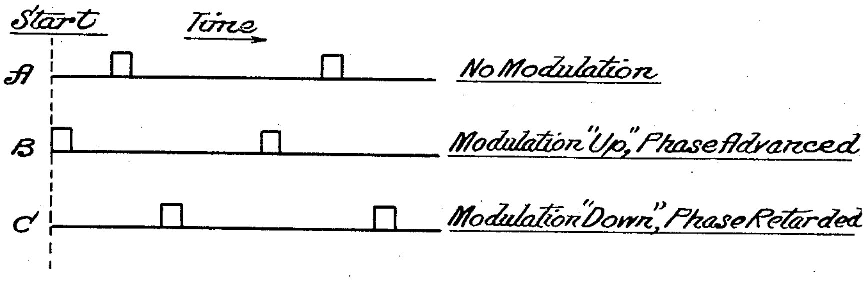
Figure 2B:
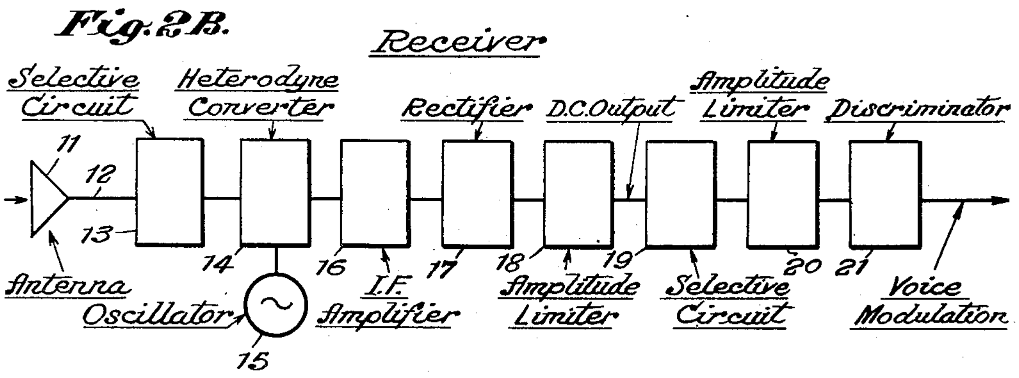

Figs. 1, 2 and 2B illustrate one form of a pulse communication system. In this system the phase of the transmitted pulse is modulated in accordance with the signal to be transmitted. This is shown in Fig. 1. With no modulation, the pulses are transmitted at a uniform rate (as shown in line A of Fig. 1). When modulation is applied, the phase of the radiated pulse is varied back and forth, as illustrated in lines B and C of Fig. 1. This type of modulation may be generated in a system such as that shown in Fig. 2 and these signals may be received with a system such as that shown in Fig. 2B.

Referring to Fig. 2, there is shown a system for the transmission of a telephone signal in which 1, 2 and 3 represent a microphone, a battery, and a transformer, respectively. A sinusoidal wave producing oscillator 5 generates a frequency which controls the frequency of the pulses and which may, for example, be a frequency of 300 kilocycles. A phase modulator 4 to which is passed the voice modulation from transformer 3 varies the phase of the 300 kilocycle carrier generated by sinusoidal generator 5. Such a phase modulator is well known in the art, and, if desired, may be of the type shown in Crosby United States Patent 2,081,577, granted May 25, 1937, or in Fig. 5 of Luck Patent 2,113,214, granted April 5, 1938. The phase modulated output of 4 is conducted to a frequency multiplier 6; which in turn is connected to a pulse generating circuit 7, the latter in turn feeding direct current pulses into the ultra high frequency generating system 8, whose output is carried through transmission line 9 to an antenna 10 which radiates the pulses. Ultra high frequency generator 8 may be a magnetron, Barkhausen oscillator or any other suitable device which is made to be operative solely at such times that the direct current pulses are supplied thereto by pulse generator 7. The connection from pulse generator 7 may extend to the anode of the generator 8, for example. The amount of phase modulation applied by modulator 4 is multiplied by the frequency multiplier 6. Thus, if the order of frequency multiplication in 6 is great, the degree of phase modulation will be greatly increased and by the application of suitable correction circuits in the audio system feeding phase modulator 4, in a manner well known in the art, the modulation may be made equivalent to a frequency modulation of the pulse rate.

Figure 2C:
Figure 2D:
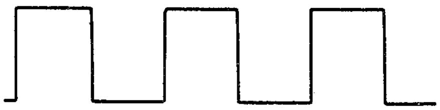

Fig. 2A illustrates, by way of example only, the component parts of the pulse generator 7 and the ultra high frequency oscillator 8 of the transmitter of Fig. 2. Inasmuch as there are numerous devices which will create the desired effects of the pulse generator and ultra high frequency oscillator, it should be understood that these are set forth by way of example rather than limitation. The apparatus of Fig. 2A corresponding to units 7 and 8 of Fig. 2 have been similarly labeled in the dotted boxes. The output of the multiplier 6 is passed through limiter circuits to convert it from a sinusoidal wave form (such as shown at Fig. 2C) to a square wave form (such as shown at Fig. 2D). Square wave form current (as shown at Fig. 2D) is passed through the primary of transformer 100, which is of such design that low frequency components are substantially absent in the wave form of the secondary voltage. The wave form of the secondary voltage of transformer 100 is substantially that shown at Fig. 2E.

Figure 2E:
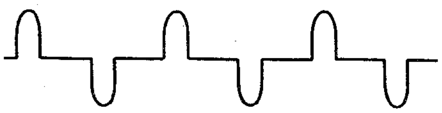
Figure 2F:
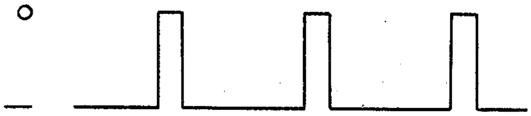
Figure 2G:
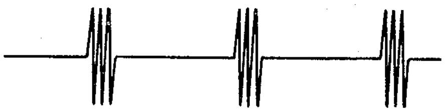

It will be noted that the secondary voltage represented by Fig. 2E consists of alternate positive and negative pulses of relatively short duration. Plate current flows in tube 101, except when its grid is biased negative past cut-off. This current through resistor 107 keeps the grids of tubes 102, 103 biased negative past cut-off. Consequently, the high frequency carrier from 104 will be transmitted to the antenna only during the time when no plate current flows in resistor 107. This condition occurs only for the duration of the negative pulses shown in Fig. 2E. Fig. 2F shows the negative voltage across resistor 107 appearing at $E_1$. Fig. 2G shows the short pulses of carrier frequency output transmitted to the antenna.

The phase or frequency modulated pulses are received in the receiver shown in Fig. 2B which is conditioned to be continuously receptive. The ultra high frequency signal is received on antenna 11 and conducted by transmission line 12 to a selective system 13 which feeds a heterodyne converter 14 where it is combined with the frequency from oscillator 15 to form an intermediate frequency. Selective circuit 13 may be an amplifier or band pass filter which is selective to the transmitted carrier frequency and wide enough to pass the pulse frequency sidebands. This intermediate frequency is amplified by selective amplifier 16 and then rectified in rectifier 17. The output of rectifier 17 is a series of direct current pulses which is in turn transmitted to an amplitude limiter system 18 in which disturbances above and below predetermined levels may be excluded. Thus, the output of limiter 18 will be in the form of direct current pulses having substantially constant amplitude and from which there will be eliminated any response to noise disturbances below a predetermined value. The output of limiter 18 feeds a selective circuit 19 which is responsive only to the frequency of the transmitted pulses, plus and minus such frequencies as will be necessary for the transmission of modulation. Thus, if the transmitted pulses occur at the rate of 300,000 per second, selective circuit 19 may be a band pass filter on the order of 6 kilocycles wide with a mid band frequency of 300 kilocycles and which will transform the direct current pulses substantially to a sinusoidal carrier. The output of selective circuit 19 is transmitted through an amplitude limiter 20 and a discriminator and detector 21. The limiter 20 and the discriminator and detector 21 may be of the same type as those commonly used in receivers built for phase modulation and/or frequency modulation purposes. Detector 21 may be of the type known as a discriminator circuit, which can employ a pair of off-tuned circuits or a circuit of the kind described in Seeley United States Patent 2,121,103, dated June 21, 1938, or it may be of the type shown in Figs. 5 and 8 of Crosby United States Patent 2,081,577. The output of this detector system will be the original voice modulation.

Figure 3:
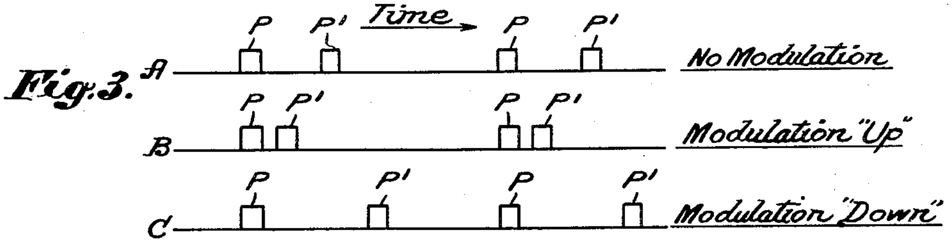
Figure 4:
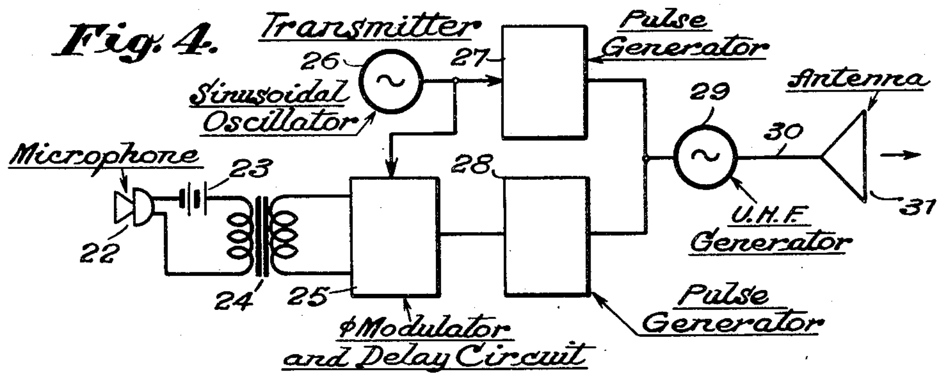
Figure 5:
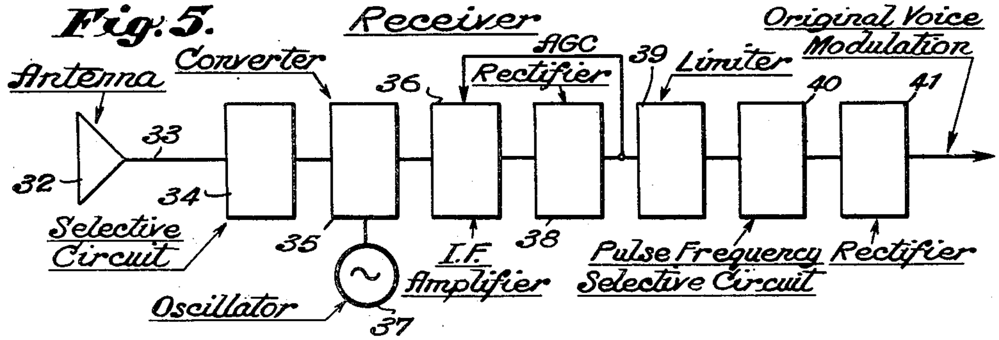

Figs. 3, 4 and 5 represent a slightly different form of communication by pulse modulation. When there is no modulation, the transmitter radiates a series of pulses timed in accordance with the relationship shown in Fig. 3, line A. In the system as shown, there is one series of pulses indicated as P, the frequency and phase of which remains constant. There is a second series of pulses indicated as $P^1$, the phase of which is modulated. The normal phase and frequency of pulses P and $P^1$ remains constant for the condition of no modulation, which is illustrated in line A of Fig. 3. Modulation causes the relative phase between pulses P and $P^1$ to vary, as indicated in lines B and C of Fig. 3. In the example shown, only the phase of pulse $P^1$ is varied by the modulation. It would obviously be possible to simultaneously modulate the phase of pulses P and $P^1$ in opposite directions.

Fig. 4 illustrates a means for producing signals with this type of modulation. A microphone is shown at 22, a battery at 23, and a transformer at 24. A sinusoidal oscillator 26 generates a frequency which controls the frequency of the pulses. The output of 26 is a constant frequency carrier which is caused to control two pulse generators 27 and 28. The control for pulse generator 28 is transmitted through a phase modulating circuit 25 so that the phase of the pulses coming out from generator 28 is modulated with respect to the phase of the pulses coming out from generator 27. It should be understood that phase modulator 25 includes a phase delay circuit such that the pulses from generator 28 are normally about 90° behind the pulses from generator 27 when no modulation is applied. The outputs of pulse generator circuits 27 and 28 are in the form of direct current pulses which operate to cause pulses of ultra high frequency carrier to be generated in 29, the output of which is conducted through transmission line 30 and radiated by antenna 31. Referring back to Fig. 3, pulses P are generated by apparatus 27 and pulses $P^1$ are generated by apparatus 28 (Fig. 4).

Fig. 5 shows a receiver for receiving the output of the transmitter of Fig. 4. The pulses of ultra high frequency carrier are received on antenna 32 connecting through transmission line 33 to selective circuit 34, the output of which is conducted to converter 35 where it is combined with the frequency from oscillator 37 to produce an intermediate frequency which is amplified by frequency selective amplifier 36 feeding rectifier 38. A voltage derived from rectifier 38 is conducted back to amplifier 36 through an automatic gain control circuit marked "AGC" which normally includes time constant circuits, usually of the resistance-condenser kind. The output of rectifier 38 is in the form of direct current pulses which are passed through an amplitude limiter 39 which operates in such a manner that noise below a certain level is discarded and pulses of any value above a predetermined level produce output pulses of a constant level. Thus the direct current pulses in the output of limiter 39 are of substantially constant amplitude. These pulses are passed through a pulse frequency band pass selective circuit 40 which is responsive only to the pulse frequency, plus and minus such frequencies as are essential to the transmission of the modulation. Thus, if the frequency generated by oscillator 26 of Fig. 4 is 300 kilocycles, circuit 40 may be a band-pass filter with a band width of about 6 kilocycles and a mid band frequency of 300 kilocycles, and which will transform the direct current pulses to substantially a sinusoidal carrier. The output of selective circuit 40 is amplitude modulated and feeds a rectifier 41, in the output of which appears the original telephone modulation.

Figure 6:
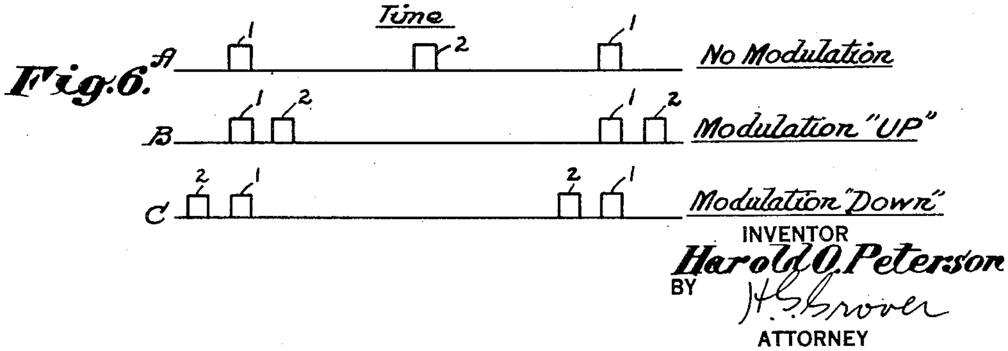
Figure 7:
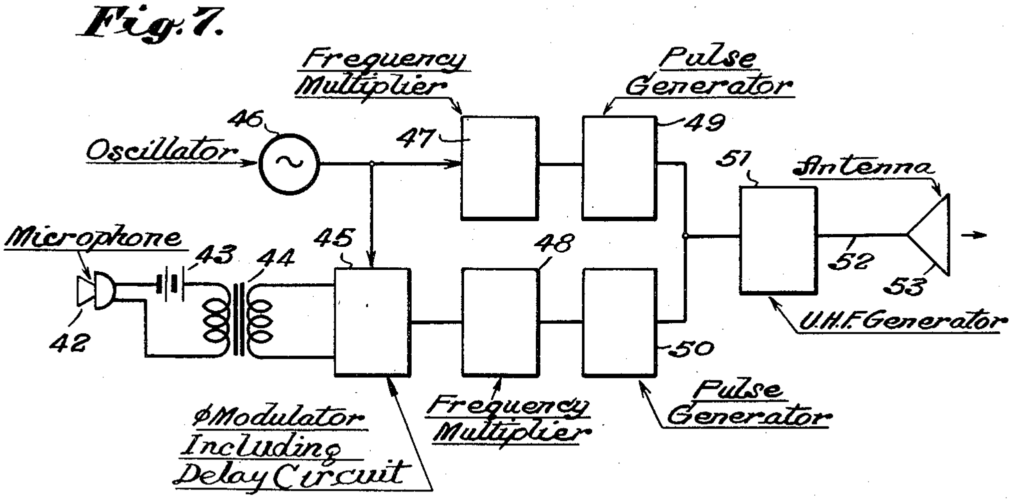
Figure 8:
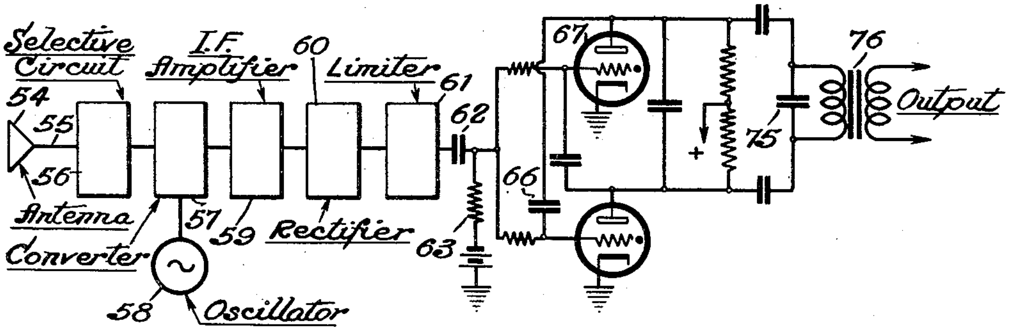

Another form of the pulse modulation system is shown in Figs. 6, 7 and 8. In this system the basic form of modulation is illustrated in Fig. 6. This is esssentially the same form of modulation as shown in Fig. 3, with the exception that a greater degree of time phase variation is used. Fig. 6, line A, illustrates the time relationship of the pulses for the condition of no modulation. The time phase of pulse 2 is varied over a range of plus and minus almost 180° with respect to the time phase of pulse 1.

One way in which this may be accomplished is illustrated in Fig. 7. A microphone is shown at 42, a battery at 43, and a transformer at 44. The output of oscillator 46 is conducted to phase modulator 45 and frequency multiplier 47. Phase modulator 45 also includes such time delay circuits as will give the correct relationship between the phase of pulses 1 and 2 for the condition of no modulation. Normally, circuit 45 will be capable of producing a degree of phase modulation up to about plus and minus 45° in the carrier frequency output of oscillator 46. This degree of modulation is increased to the desired value of approximately a maximum of plus and minus 180° by frequency multiplier 48. There is the same degree of frequency multiplication in frequency multiplier 47 so that equal carrier frequencies come out of the frequency multipliers 47 and 48 during the condition of no modulation. The outputs of 47 and 48 control pulse generator circuits 49 and 50 which produce short direct current pulses at the phase and frequency determined by the outputs of 47 and 48. These short direct current pulses control the radiation of ultra high frequency pulses through the ultra high frequency generator 51, transmission line 52 and antenna 53. In effect, apparatus 47 produces the pulses 1 of Fig. 6, while apparatus 48 produces the pulses 2 of Fig. 6.

The output of the transmitter (Fig. 7) may be received on the receiving system (Fig. 8). The transmitted short pulses of ultra high frequency carrier are received on antenna 54 and conducted by transmission line 55 to selective circuit 56 which feeds converter 57. In converter 57 the ultra high frequency is combined with the frequency generated by oscillator 58 to form an intermediate frequency which is conducted to selective amplifier 59. The intermediate frequency output of 59 feeds a rectifier 60, the output of which is a series of short direct current pulses. These pulses are passed through amplitude limiter 61 which removes noise elements below a predetermined level and passes direct current pulses of constant amplitude to a detector circuit through condenser 62. The detector in this case is a gas triode oscillator circuit of the type known as a "counter" circuit. It is so arranged that the number of cycles appearing in the output is one-half of the number of cycles impressed at the input. This type of "counter" circuit is quite extensively used in connection with Geiger counters for the study of cosmic ray phenomena and its operation is well known to the art. With such a circuit it will be found that the audio modulation can be taken off, as shown, in transformer 76. The transformer 76 will not pass the pulse frequency but only the audio frequencies.

Figs. 9 and 10 illustrate how the pulse modulation system above described may be used in a multiplex system. Fig. 9 represents a multiplex transmitter in which two different pulse frequencies are used. These pulse frequencies are generated by oscillators 81 and 90. The modulators and pulse generating circuits in any of the transmitters above described are shown at 80, 82 and 89, 91, respectively. The two modulated pulse frequencies operate to control pulses of ultra high frequency carrier in generator system 83 which are radiated by antenna 85.

Fig. 10 represents a multiplex receiving system in which the short pulses of ultra high frequency carrier are received on antenna 92 which is connected to receiving system 93, which may be of any of the types above described up to the point where the pulse frequency appears. The rectified pulse frequency energy is impressed on two branches in which the desired channels are selected by selective circuits 94 and 97, respectively, followed by amplitude limiters 95 and 98 which, in turn, are followed respectively by demodulating and detecting circuits 96 and 99. While only two channels are shown, it should be understood that the system may be extended to transmit a larger number of channels. It should also be understood that one or more of the channels may in turn be multiplexed by either frequency, phase or amplitude modulation. For example, first channel instead of being a telephone channel may consist of a number of tone channels each of which is either amplitude modulated, phase modulated, or frequency modulated.

What is claimed is:

1. In a pulse modulation radio communication system wherein the radiated carrier is broken up into equal length pulses of short duration and the relationship of the pulses varied in accordance with the signal to be transmitted, a transmitter for varying the time phase relation of the pulses, comprising a constant frequency sinusoidal wave oscillator, a frequency multiplier and a phase modulator individually coupled to the output of said oscillator, means for applying signal modulations to said phase modulator, a frequency multiplier coupled to the output of said phase modulator, individual pulse generators coupled to the outputs of both of said two frequency multipliers for producing short direct current pulses at the phase and frequency determined by said multipliers, an ultra high frequency generator circuit, means for impressing the outputs of said pulse generators upon said ultra high frequency generator circuit for keying the same and thereby controlling the generation of pulses of ultra high frequency energy therefrom, whereby there are produced short duration pulses of varying time phase in dependence upon the variations in signal modulations, and means for radiating the carrier pulses produced by said generator.

2. In a pulse modulation radio communication system wherein the radiated carrier is broken up into equal length ultra high frequency energy pulses of short duration and the phase relationship of the pulses varied in accordance with the signal to be transmitted, a transmitter for varying the phase relation of the pulses comprising a constant frequency sinusoidal wave oscillator, a phase modulator, a source of signal modulations, connections individually coupling said oscillator and said source of signal modulations to said modulator, a frequency multiplier coupled to the output of said modulator, a pulse generator coupled to the output of said multiplier, an ultra high frequency generator coupled to the output of and under control of said pulse generator, and means for radiating the carrier wave pulses passed by said high frequency generator.

3. A pulse communication system having, in combination, a transmitter comprising a pair of pulse generators, a phase modulator and delay circuit coupled to the input of one of said pulse generators, a sinusoidal oscillator coupled to said modulator and delay circuit and also to the input of said other pulse generator, a signal source coupled to the input of said phase modulator and delay circuit, an ultra high frequency generator coupled in common to the outputs of said pair of pulse generators, a radiator coupled to said high frequency generator for radiating pulses of ultra high frequency energy whose relationship varies in accordance with the signal to be transmitted, a receiver for said radiated pulses comprising an antenna, a selective circuit coupled to said antenna and selective to the transmitted carrier frequency, said selective circuit having a pass band sufficiently wide to pass the pulse frequency side bands, a heterodyne converter coupled to the output of said selective circuit, a beating oscillator coupled to the input of said converter, whereby an intermediate frequency is produced by said converter, a selective amplifier for amplifying the intermediate frequency output of said converter, a rectifier coupled to said amplifier for producing a series of direct current pulses, an automatic gain control circuit including suitable time-constant circuits for deriving a voltage from said rectifier and for feeding back said voltage to said selective intermediate frequency amplifier, an amplitude limiter coupled to the output of said rectifier for excluding disturbances outside a desired level and for producing substantially constant amplitude direct current pulses, a selective wave shaping circuit coupled to the output of said limiter and responsive only to the frequency of the transmitted pulses plus and minus such frequencies as are necessary for the transmission of the modulation, said selective wave shaping circuit being constructed and arranged to transform the direct current pulses passed thereto to a sinusoidal carrier, and means for transforming the output of said last selective circuit to reproduce the original modulation at the transmitter.

4. A pulse radio communication system having, in combination, a transmitter for varying the time phase relation of the pulses, comprising a constant frequency sinusoidal wave oscillator, a frequency multiplier and a phase modulator individually coupled to the output of said oscillator, means for applying signal modulations to said phase modulator, a frequency multiplier coupled to the output of said phase modulator, individual pulse generators coupled to the outputs of both of said two frequency multipliers for producing short direct current pulses at the phase and frequency determined by said multipliers, an ultra high frequency generator circuit, means for impressing the outputs of said pulse generators upon said ultra high frequency generator circuit for keying the same and thereby controlling the generation of pulses of ultra high frequency energy therefrom, whereby there are produced short duration pulses of varying time phase in dependence upon the variations in signal modulations, and means for radiating the carrier pulses produced by said keyed generator, a receiver for said radiated pulses comprising an antenna, a selective circuit coupled to said antenna and selective to the transmitted carrier frequency, said selective circuit having a pass band sufficiently wide to pass the pulse frequency side bands, a heterodyne converter coupled to the output of said selective circuit, a beating oscillator coupled to the input of said converter, whereby an intermediate frequency is produced by said converter, a selective amplifier for amplifying the intermediate frequency output of said converter, a rectifier coupled to said amplifier for producing a series of direct current pulses, an amplitude limiter coupled to the output of said rectifier for excluding disturbances outside a desired level and for producing substantially constant amplitude direct current pulses, a frequency divider detector circuit coupled to the output of said amplitude limiter, said detector circuit including a gaseous tube trigger arrangement for providing in its output only half the number of cycles impressed upon its input, and a selective circuit coupled to the output of said frequency divider detector circuit and so constructed and arranged as to discriminate against the pulse frequency and pass only audio frequencies.

5. A pulse type multiplex transmitter system including a pair of channels each of which comprises a source of modulating signals, a phase modulator coupled to said source, an oscillator also coupled to said phase modulator, and a pulse generator coupled to the output of and under control of said phase modulator, the oscillators in said pair of channels generating different frequencies, circuit connections combining the outputs of said pulse generators in said pair of channels, an ultra high frequency generator under control of the combined outputs of said pulse generator, and a wave radiating structure coupled to the output of said ultra high frequency generator.

6. In a pulse modulation radio communication system wherein the radiated carrier is broken up into equal length pulses of short duration and the relationship of the pulses varied in accordance with the signal to be transmitted, a receiver for said radiated pulses comprising an antenna, a selective circuit coupled to said antenna and selective to the transmitted carrier frequency, said selective circuit having a pass band sufficiently wide to pass the pulse frequency side bands, a heterodyne converter coupled to the output of said selective circuit, a beating oscillator coupled to the input of said converter, whereby an intermediate frequency is produced by said converter, a selective amplifier for amplifying the intermediate frequency output of said converter, a rectifier coupled to said amplifier for producing a series of direct current pulses, an amplitude limiter coupled to the output of said rectifier for excluding disturbances outside a desired level and for producing substantially constant amplitude direct current pulses, a frequency divider detector circuit coupled to the output of said amplitude limiter, said detector circuit including a gaseous tube trigger arrangement for providing in its output only half the number of cycles impressed upon its input, and a selective circuit coupled to the output of said frequency divider detector circuit and so constructed and arranged as to discriminate against the pulse frequency and pass only audio frequencies.

7. In a pulse modulation radio communication system wherein the radiated carrier is broken up into equal length pulses of short duration and the relationship of the pulses varied in accordance with the signal to be transmitted, a transmitter for varying the time phase relation of the pulses, comprising a constant frequency sinusoidal wave oscillator, a frequency multiplier and a phase modulator individually coupled to the output of said oscillator, a microphone coupled to and supplying signal modulations to said phase modulator, said phase modulator including time delay circuits, a frequency multiplier coupled to the output of said phase modulator, individual pulse generators coupled to the outputs of both of said two frequency multipliers for producing short direct current pulses at the phase and frequency determined by said multipliers, said frequency multipliers being so constructed and arranged that equal carrier output frequencies are derived therefrom during the condition of no modulation, an ultra high frequency generator circuit, means for impressing the outputs of said pulse generators upon said ultra high frequency generator circuit for keying the same and thereby controlling the generation of pulses of ultra high frequency energy therefrom, whereby there are produced short duration pulses of varying time phase in dependence upon the variations in signal modulations, and means including a wave directive structure for radiating the carrier pulses produced by said generator.

8. A pulse communication system having, in combination, a transmitter comprising a pair of pulse generators, a phase modulator and delay circuit coupled to the input of one of said pulse generators, a sinusoidal oscillator coupled to said modulator and delay circuit and also to the input of said other pulse generator, a signal source coupled to the input of said phase modulator and delay circuit, a high frequency generator coupled in common to and responsive to the outputs of said pair of pulse generators, and a high frequency transmission medium coupled to the output of said high frequency generator.

9. A pulse communication system having, in combination, a transmitter comprising a pair of pulse generators, a phase modulator and delay circuit coupled to the input of one of said pulse generators, a sinusoidal oscillator coupled to said modulator and delay circuit and also to the input of said other pulse generator, means for applying signals to the input of said phase modulator and delay circuit, an ultra high frequency generator coupled in common to the outputs of said pair of pulse generators, a radiator coupled to said high frequency generator for radiating pulses of ultra high frequency energy whose relationship varies in accordance with the signal to be transmitted, a receiver for said radiated pulses comprising an antenna, a selective circuit coupled to said antenna and selective to the transmitted carrier frequency, said selective circuit having a pass band sufficiently wide to pass the pulse frequency side bands, a heterodyne converter coupled to the output of said selective circuit, a beating oscillator coupled to the input of said converter, whereby an intermediate frequency is produced by said converter, a selective amplifier for amplifying the intermediate frequency output of said converter, a rectifier coupled to said amplifier for producing a series of direct pulses, an amplitude limiter coupled to the output of said rectifier for excluding disturbances outside a desired level and for producing substantially constant amplitude direct current pulses, a selective wave shaping circuit coupled to the output of said limiter and responsive only to the frequency of the transmitted pulses plus and minus such frequencies as are necessary for the transmission of the modulation, said selective wave shaping circuit being constructed and arranged to transform the direct current pulses passed thereto to a sinusoidal carrier, and means for transforming the output of said last selective circuit to reproduce the original modulation at the transmitter.

10. A pulse communication system having, in combination, a transmitter comprising a pair of pulse generators, a phase modulator circuit coupled to the input of one of said pulse generators, means for supplying sinusoidal waves to said phase modulator and to said other pulse generator, means for supplying signal waves to said phase modulator, means for connecting together the outputs of said pulse generators, a high frequency generator coupled to said connection and responsive to the outputs of said pair of pulse generators, and a high frequency transmission medium coupled to the output of said high frequency generator.

11. A pulse transmitter comprising a pair of pulse generators, a phase modulator circuit coupled to the input of one of said pulse generators, means for supplying sinusoidal waves to said phase modulator and to said other pulse generator, means including a microphone for supplying speech waves to said phase modulator, means for connecting together the outputs of said pulse generators, a high frequency generator coupled to said connection and responsive to the outputs of said pair of pulse generators, and an antenna coupled to the output of said high frequency generator.

HAROLD O. PETERSON.

REFERENCES CITED

The following references are of record in the file of this patent:

UNITED STATES PATENTS

| Number | Name | Date |
|---|---|---|
| 1,877,561 | Davis | Sept. 13, 1932 |
| 2,072,962 | Plebanski | Mar. 9, 1937 |
| 2,081,577 | Crosby | May 25, 1937 |
| 2,087,428 | Crosby | July 20, 1937 |
| 2,169,212 | Armstrong | Aug. 15, 1939 |
| 2,246,164 | Crosby | June 17, 1941 |
| 2,266,401 | Reeves | Dec. 16, 1941 |
| 2,280,707 | Kell | Apr. 21, 1942 |
| 2,298,409 | Peterson | Oct. 13, 1942 |
| 2,311,796 | Wrathall | Feb. 23, 1943 |
| 2,328,944 | Beatty | Sept. 7, 1943 |
| 2,361,437 | Trevor | Oct. 31, 1944 |
| 2,379,899 | Hansell | July 10, 1945 |
| 2,379,900 | Hansell | July 10, 1945 |
| 2,392,546 | Peterson | Jan. 8, 1946 |
| 2,401,619 | Trevor | June 4, 1946 |